US010845462B2

(12) United States Patent
Hess

(10) Patent No.: US 10,845,462 B2
(45) **Date of Patent: *Nov. 24, 2020**

(54) VEHICLE RADAR SYSTEM WITH SHAPED ANTENNAS

(71) Applicant: MAGNA ELECTRONICS INC., Auburn Hills, MI (US)

(72) Inventor: Holger Hess, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,457

(22) Filed: May 4, 2020

(65) Prior Publication Data

US 2020/0264277 A1 Aug. 20, 2020

Related U.S. Application Data

(63) Continuation of application No. 15/675,919, filed on Aug. 14, 2017, now Pat. No. 10,641,867.

(Continued)

(51) Int. Cl.

*G01S 7/40* (2006.01)
*G01S 13/04* (2006.01)

(Continued)

(52) U.S. Cl.

CPC .......... *G01S 7/4021* (2013.01); *G01S 7/2813* (2013.01); *G01S 7/4008* (2013.01); *G01S 13/04* (2013.01);

(Continued)

(58) Field of Classification Search

CPC ......... B60R 21/0134; B60R 2001/1223; G01S 13/931; G01S 2013/9332; G01S 17/936;

(Continued)

(56) References Cited

U.S. PATENT DOCUMENTS

| | | | |
|---|---|---|---|
| 3,099,836 | A | 7/1963 | Carr |
| 5,467,072 | A | 11/1995 | Michael |

(Continued)

FOREIGN PATENT DOCUMENTS

| | | | |
|---|---|---|---|
| WO | 2011090484 | A1 | 7/2011 |
| WO | 2018007995 | A1 | 1/2018 |

*Primary Examiner* — Olumide Ajibade Akonai

(74) *Attorney, Agent, or Firm* — Honigman LLP

(57) ABSTRACT

A vehicular radar sensing system includes a radar sensor disposed at a vehicle. The radar sensor includes a plurality of antennas, which includes a plurality of transmitting antennas and a plurality of receiving antennas. The radar sensor transmits multiple outputs via the plurality of transmitting antennas and receives multiple inputs via the plurality of receiving antennas. The plurality of antennas includes a plurality of sets of antennas, each set having a V shape or an X shape, and with each of the shaped sets of antennas having an apex. A signal feed is provided to the apex of each of the shaped sets of antennas. Outputs of the receiving antennas are communicated to a processor, and the processor, responsive to the outputs of the receiving antennas, determines presence of one or more objects exterior the vehicle and within the field of sensing of the radar sensor.

23 Claims, 3 Drawing Sheets radiating / receiving patch
signal trace
patch center
signal feed
rectangular grid arrangement

Related U.S. Application Data

(60) Provisional application No. 62/375,161, filed on Aug. 15, 2016.

(51) Int. Cl.

| | |
|---|---|
| ***G01S 13/87*** | (2006.01) |
| ***G01S 13/931*** | (2020.01) |
| ***G01S 15/87*** | (2006.01) |
| ***G01S 15/931*** | (2020.01) |
| ***H01Q 13/02*** | (2006.01) |
| ***G01S 15/04*** | (2006.01) |
| ***H01Q 1/32*** | (2006.01) |
| ***G01S 7/28*** | (2006.01) |
| ***H01Q 21/06*** | (2006.01) |
| ***H01Q 21/29*** | (2006.01) |
| ***B60K 31/00*** | (2006.01) |
| ***B60Q 9/00*** | (2006.01) |

(52) U.S. Cl.

CPC .......... *G01S 13/878* (2013.01); *G01S 13/931* (2013.01); *G01S 15/04* (2013.01); *G01S 15/876* (2013.01); *G01S 15/931* (2013.01); *H01Q 1/3233* (2013.01); *H01Q 13/0233* (2013.01); *H01Q 21/065* (2013.01); *H01Q 21/293* (2013.01); *B60K 31/0008* (2013.01); *B60Q 9/008* (2013.01); *G01S 2013/9323* (2020.01)

(58) Field of Classification Search

CPC ..... G01S 2013/0245; G01S 2013/9375; G01S 2013/9389; G08G 1/167; H01Q 1/3233; H01Q 21/065; H01Q 1/36; H01Q 21/08; H01Q 9/0407; H01Q 9/28; H01Q 9/44; H01Q 19/106; H01Q 19/17; H01Q 1/243; B60K 31/0008; B60Q 9/008

See application file for complete search history.

(56) References Cited

U.S. PATENT DOCUMENTS

| | | | | | |
|---|---|---|---|---|---|
| 5,600,337 | A * | 2/1997 | Cassel | H01Q 1/243 | 343/767 |
| 5,657,023 | A | 8/1997 | Lewis et al. | | |
| 5,949,331 | A | 9/1999 | Schofield et al. | | |
| 6,014,105 | A | 1/2000 | Davis et al. | | |
| 6,169,521 | B1 * | 1/2001 | Kitamura | H01Q 1/243 | 343/702 |
| 6,587,186 | B2 | 7/2003 | Bamji et al. | | |
| 6,674,895 | B2 | 1/2004 | Rafii et al. | | |
| 6,678,039 | B2 | 1/2004 | Charbon | | |
| 6,690,354 | B2 | 2/2004 | Sze | | |
| 6,710,770 | B2 | 3/2004 | Tomasi et al. | | |
| 6,747,606 | B2 | 6/2004 | Harel et al. | | |
| 6,825,455 | B1 | 11/2004 | Schwarte | | |
| 6,876,775 | B2 | 4/2005 | Torunoglu | | |
| 6,906,793 | B2 | 6/2005 | Bamji et al. | | |
| 6,919,549 | B2 | 7/2005 | Bamji et al. | | |
| 7,053,357 | B2 | 5/2006 | Schwarte | | |
| 7,157,685 | B2 | 1/2007 | Bamji et al. | | |
| 7,176,438 | B2 | 2/2007 | Bamji et al. | | |
| 7,203,356 | B2 | 4/2007 | Gokturk et al. | | |
| 7,212,663 | B2 | 5/2007 | Tomasi | | |
| 7,283,213 | B2 | 10/2007 | O'Connor et al. | | |
| 7,310,431 | B2 | 12/2007 | Gokturk et al. | | |
| 7,321,111 | B2 | 1/2008 | Bamji et al. | | |
| 7,340,077 | B2 | 3/2008 | Gokturk et al. | | |
| 7,352,454 | B2 | 4/2008 | Bamji et al. | | |
| 7,375,803 | B1 | 5/2008 | Bamji | | |
| 7,379,100 | B2 | 5/2008 | Gokturk et al. | | |
| 7,379,163 | B2 | 5/2008 | Rafii et al. | | |
| 7,405,812 | B1 | 7/2008 | Bamji | | |
| 7,408,627 | B2 | 8/2008 | Bamji et al. | | |
| 8,013,780 | B2 | 9/2011 | Lynam | | |
| 8,027,029 | B2 | 9/2011 | Lu et al. | | |
| 9,036,026 | B2 | 5/2015 | Dellantoni et al. | | |
| 9,146,898 | B2 | 9/2015 | Ihlenburg et al. | | |
| 9,270,028 | B2 | 2/2016 | Ruvinsky et al. | | |
| 9,575,160 | B1 | 2/2017 | Davis et al. | | |
| 9,599,702 | B1 | 3/2017 | Bordes et al. | | |
| 9,620,861 | B1 | 4/2017 | Banks | | |
| 10,641,867 | B2 * | 5/2020 | Hess | G01S 7/4008 | |
| 2010/0231464 | A1 | 9/2010 | Huang et al. | | |
| 2010/0245066 | A1 | 9/2010 | Sarioglu et al. | | |
| 2012/0115429 | A1 | 5/2012 | Falk | | |
| 2013/0127685 | A1 * | 5/2013 | Ikehata | H01Q 21/24 | 343/876 |
| 2013/0249764 | A1 * | 9/2013 | Amaya | H01Q 1/243 | 343/845 |
| 2014/0028515 | A1 * | 1/2014 | Lu | H01Q 1/36 | 343/793 |
| 2015/0145695 | A1 | 5/2015 | Hyde et al. | | |
| 2016/0033640 | A1 | 2/2016 | De Mersseman et al. | | |
| 2016/0084941 | A1 | 3/2016 | Arage | | |
| 2017/0222311 | A1 | 8/2017 | Hess et al. | | |
| 2017/0254873 | A1 | 9/2017 | Koravadi | | |
| 2017/0276788 | A1 | 9/2017 | Wodrich | | |
| 2017/0310004 | A1 | 10/2017 | Swirhun et al. | | |
| 2017/0315231 | A1 | 11/2017 | Wodrich | | |
| 2017/0356994 | A1 | 12/2017 | Wodrich et al. | | |
| 2018/0015875 | A1 | 1/2018 | May et al. | | |

* cited by examiner rhombus grid arrangement

VEHICLE RADAR SYSTEM WITH SHAPED ANTENNAS

CROSS REFERENCE TO RELATED APPLICATIONS

The present application is a continuation of U.S. patent application Ser. No. 15/675,919, filed Aug. 14, 2017, now U.S. Pat. No. 10,641,867, which claims the filing benefits of U.S. provisional application Ser. No. 62/375,161, filed Aug. 15, 2016, which is hereby incorporated herein by reference in its entirety.

FIELD OF THE INVENTION

The present invention relates generally to a vehicle sensing system for a vehicle and, more particularly, to a vehicle sensing system that utilizes a plurality of sensors at a vehicle to provide a field of sensing around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes one or more sensors (such as radar sensors or the like) disposed at the vehicle to sense respective regions exterior of the vehicle, with the sensors or sensor units comprising a plurality of transmitters and receivers disposed at the vehicle. The sensors comprise an array of multiple radar antennas. The plurality of transmitting antennae and the plurality of receiving antennae are arranged in a two dimensional array of antennae, with the array arranged as a rhombus shape, so as to provide a V-shaped or X-shaped antenna array. Outputs of the two dimensional array of antennae are communicated to a control for processing and, responsive to such processing, the control determines the presence of one or more objects exterior the vehicle and within the field of sensing of the antenna array.

These and other objects, advantages, purposes and features of the present invention will become apparent upon review of the following specification in conjunction with the drawings.

DESCRIPTION OF THE PREFERRED EMBODIMENTS

A vehicle sensing system, such as a driver assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space. The system comprises a radar system having a plurality of radar antenna for transmitting and receiving signals. The system includes a processor that is operable to receive sensing data from multiple sensors to detect objects present in the field of sensing of the radar system. For example, the processor or control may apply two dimensional multiple input multiple output processing to outputs of the two dimensional array of antennae. Responsive to such processing, the control determines the presence of one or more objects exterior the vehicle and within the field of sensing of the antenna array. The sensing system may, for example, provide sensing for at least one of automated parking, blind spot detection, cross traffic alert, lane change and merge aid, automatic emergency braking, pedestrian detection, turn assist, and intersection collision mitigation.

Automotive radar systems typically comprise multiple transmit and receive antennas, called antenna arrays. The total size (aperture) of such an antenna array formation defines the angular accuracy and angular discrimination capabilities of the radar sensing system.

Figure 2:
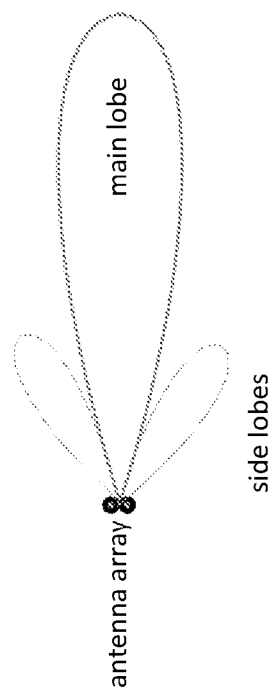
FIG. 2 is a diagram showing the resulting antenna characteristics in far field for the antenna arrays of FIG. 1.
Figure 1:
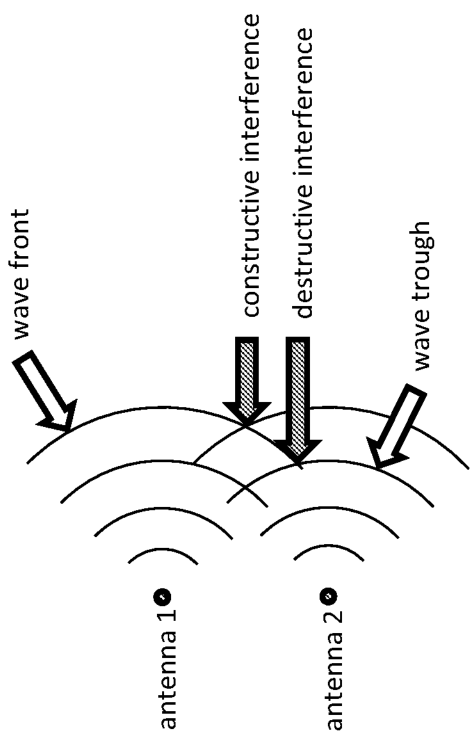
FIG. 1 is a diagram showing standard radar antenna arrays, showing interference effects in the antenna arrays.

Typical radar antennas are typically arrangements of multiple radio antennas. The purpose of such an antenna array is to shape the antenna characteristics. Signals of the different antenna elements in the array will experience constructive and destructive interference (see FIG. 1). These interference effects appear on transmit as well as on receive antennas. These interference effects provide different signal power depending on where it is measured around the antenna. For example, in the far field, interference effects shape the antenna characteristics to a beam (such as shown in FIG. 2). The main beam (also called main lobe) contains the maximum power of the so shaped antenna characteristic. However, interference also gives additional side lobes (FIG. 2) which are usually unwanted (because it is wasted energy for signal transmission).

Figure 4:
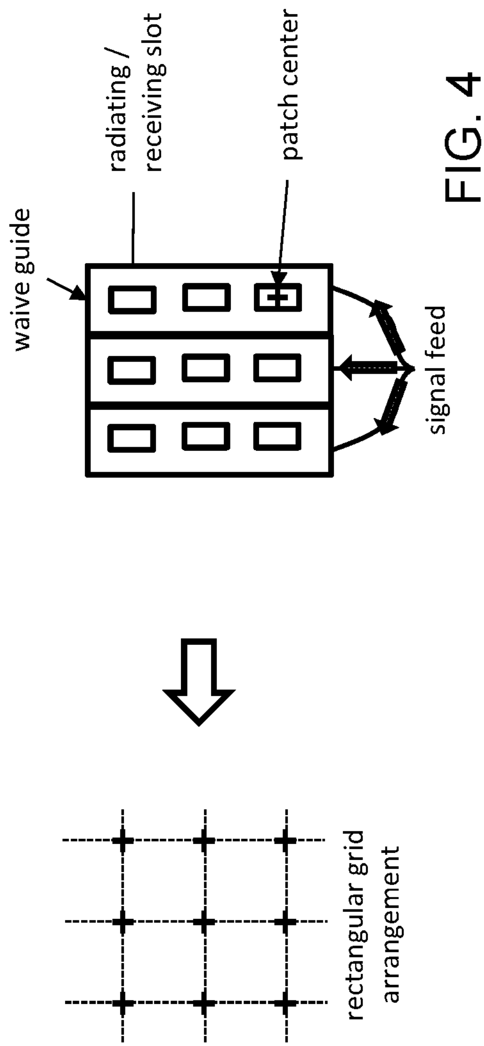
FIG. 4 is a diagram of a typical radar slotted wave guide antenna array having a rectangular grid pattern.
Figure 3:
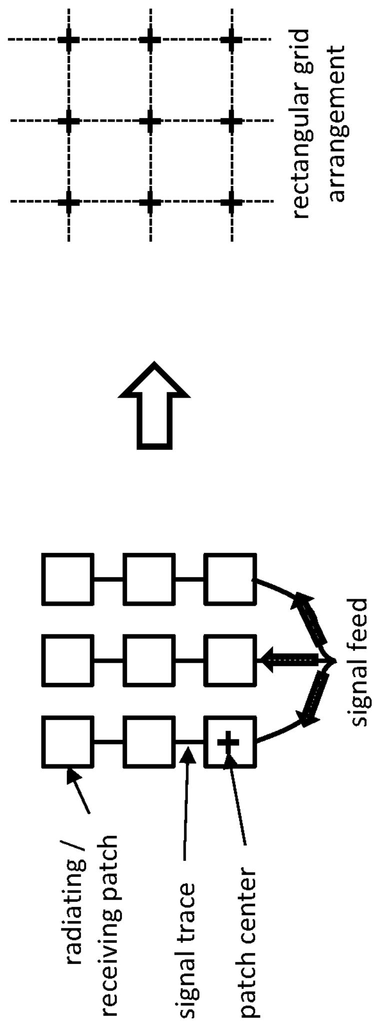
FIG. 3 is a diagram of a typical radar patch antenna array having a rectangular grid pattern.

Typical radar antennas are arranged in a rectangular grid pattern. For example, a patch antenna array (FIG. 3) comprises a rectangular grid arrangement of radiating/receiving patches, while a slotted wave guide antenna array (FIG. 4) comprises a rectangular grid arrangement of radiating/receiving slots.

Figure 7:
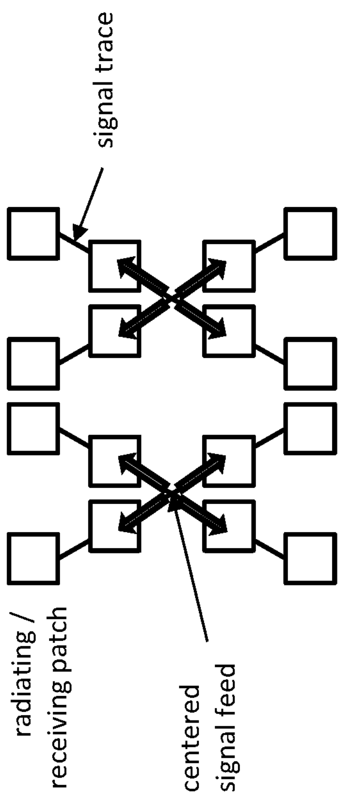
FIG. 7 is a diagram showing X-shaped antenna arrays of the present invention.
Figure 5:
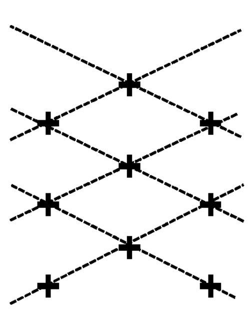
FIG. 5 is a schematic of an antenna array arranged as rhombuses in accordance with the present invention.
Figure 6:
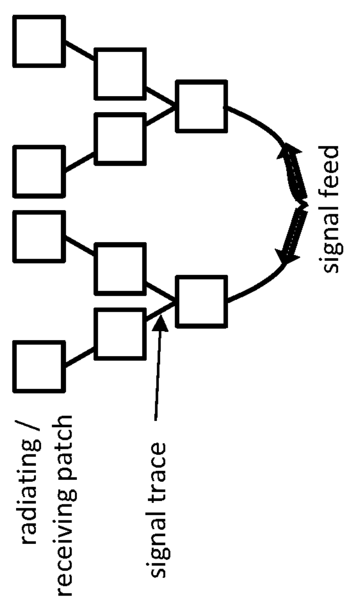
FIG. 6 is a diagram showing V-shaped antenna arrays of the present invention.

The present invention provides a radar sensing system that arranges the antennas in a rhombus shape (see FIG. 5). The rhombus grid arrangement or antenna array reduces unwanted side lobes. For example, an antenna array of the present invention may comprise a generally V-shaped antenna array (see FIG. 6), where a plurality of radiating/receiving patches (or slots) are arranged as two V-shaped antenna arrays, and with a signal feed to the apex of each of the V-shaped arrays. Optionally, for example, an antenna array of the present invention may comprise a generally X-shaped antenna array (see FIG. 7), where a plurality of radiating/receiving patches (or slots) are arranged as two X-shaped antenna arrays, and with a centered signal feed to the center portion of each of the X-shaped arrays.

Thus, the present invention provides enhanced sensing via the non-rectangular grid arrangement of the antenna slots or patches. The rhombus grid arrangement results in reduced unwanted side lobes and thus enhanced sensing of objects present in the field of sensing of the radar system.

Although described as having a plurality of radar or ultrasonic sensors or sensor units disposed at the vehicle, the system of the present invention may utilize any suitable type of sensors, such as Lidar sensors or the like. The means to adapt for the vehicle body response may be adjusted according to the type of sensors implemented in the sensing system.

The system may utilize sensors, such as radar or lidar sensors or the like. The sensing system may utilize aspects of the systems described in U.S. Pat. Nos. 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication Nos. US-2017-0222311 and/or US-2010-0245066, and/or U.S. patent applications, Ser. No. 15/647,339, filed Jul. 12, 2017, now U.S. Pat. No. 10,239,446, Ser. No. 15/619,627, filed Jun. 12, 2017, and published on Dec. 14, 2017 as U.S. Publication No. US-2017-0356994, Ser. No. 15/584,265, filed May 2, 2017, now U.S. Pat. No. 10,534,081, Ser. No. 15/467,247, filed Mar. 23, 2017, now U.S. Pat. No. 10,571,562, and/or Ser. No. 15/446,220, filed Mar. 1, 2017, and published on Sep. 7, 2017 as U.S. Publication No. US-2017-0254873, and/or International PCT Application No. PCT/IB2017/054120, filed Jul. 7, 2017, and published on Jan. 11, 2018 as International Publication No. WO 2018/007995, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, said vehicular radar sensing system comprising:

- a radar sensor disposed at a vehicle equipped with said vehicular radar sensing system;
- wherein said radar sensor comprises a plurality of antennas;
- wherein said plurality of antennas comprises a plurality of transmitting antennas and a plurality of receiving antennas;
- wherein said radar sensor transmits multiple outputs via said plurality of transmitting antennas and receives multiple inputs via said plurality of receiving antennas;
- wherein said plurality of antennas comprises a plurality of sets of antennas each set having a V shape, and wherein each of the V-shaped sets of antennas comprises an apex;
- a processor;
- wherein a signal feed is provided to the apex of each of the V-shaped sets of antennas; and
- wherein outputs of said receiving antennas are communicated to said processor, and wherein said processor, responsive to the outputs of said receiving antennas, determines presence of one or more objects exterior the vehicle and within a field of sensing of said radar sensor.

2. The vehicular radar sensing system of claim 1, wherein the V-shaped sets of antennas reduce side lobes.

3. The vehicular radar sensing system of claim 1, wherein said processor, responsive to the outputs of said receiving antennas, determines the presence of one or more objects to assist a driver of the vehicle in parking the vehicle in a parking space.

4. The vehicular radar sensing system of claim 1, wherein said processor, responsive to the outputs of said receiving antennas, determines the presence of one or more objects to assist a driver of the vehicle in maneuvering the vehicle in a forward direction.

5. The vehicular radar sensing system of claim 1, wherein said processor, responsive to the outputs of said receiving antennas, determines the presence of one or more objects to assist a driver of the vehicle in maneuvering the vehicle in a rearward direction.

6. The vehicular radar sensing system of claim 1, wherein said vehicular radar sensing system provides sensing for blind spot detection.

7. The vehicular radar sensing system of claim 1, wherein said vehicular radar sensing system provides sensing for automatic emergency braking of the vehicle.

8. The vehicular radar sensing system of claim 1, wherein said vehicular radar sensing system provides sensing for pedestrian detection.

9. The vehicular radar sensing system of claim 1, wherein said vehicular radar sensing system provides sensing for at least one selected from the group consisting of (i) automated parking of the vehicle, (ii) cross traffic alert, (iii) lane change and merge aid, (iv) turn assist and (v) intersection collision mitigation.

10. A vehicular radar sensing system, said vehicular radar sensing system comprising:

- a radar sensor disposed at a vehicle equipped with said vehicular radar sensing system;
- wherein said radar sensor comprises a plurality of antennas;
- wherein said plurality of antennas comprises a plurality of transmitting antennas and a plurality of receiving antennas;
- wherein said radar sensor transmits multiple outputs via said plurality of transmitting antennas and receives multiple inputs via said plurality of receiving antennas;
- wherein said plurality of antennas comprises a plurality of sets of antennas each set having an X shape, and wherein each of the X-shaped sets of antennas comprises an apex;
- a processor;
- wherein a signal feed is provided to the apex of each of the X-shaped sets of antennas; and
- wherein outputs of said receiving antennas are communicated to said processor, and wherein said processor, responsive to the outputs of said receiving antennas, determines presence of one or more objects exterior the vehicle and within a field of sensing of said radar sensor.

11. The vehicular radar sensing system of claim 10, wherein the X-shaped sets of antennas reduce side lobes.

12. The vehicular radar sensing system of claim 10, wherein said processor, responsive to the outputs of said receiving antennas, determines the presence of one or more objects to assist a driver of the vehicle in parking the vehicle in a parking space.

13. The vehicular radar sensing system of claim 10, wherein said processor, responsive to the outputs of said receiving antennas, determines the presence of one or more objects to assist a driver of the vehicle in maneuvering the vehicle in a forward direction.

14. The vehicular radar sensing system of claim 10, wherein said processor, responsive to the outputs of said receiving antennas, determines the presence of one or more objects to assist a driver of the vehicle in maneuvering the vehicle in a rearward direction.

15. The vehicular radar sensing system of claim 10, wherein said vehicular radar sensing system provides sensing for blind spot detection.

16. The vehicular radar sensing system of claim 10, wherein said vehicular radar sensing system provides sensing for automatic emergency braking of the vehicle.

17. The vehicular radar sensing system of claim 10, wherein said vehicular radar sensing system provides sensing for pedestrian detection.

18. The vehicular radar sensing system of claim 10, wherein said vehicular radar sensing system provides sensing for at least one selected from the group consisting of (i) automated parking of the vehicle, (ii) cross traffic alert, (iii) lane change and merge aid, (iv) turn assist and (v) intersection collision mitigation.

19. A vehicular radar sensing system, said vehicular radar sensing system comprising:

a radar sensor disposed at a vehicle equipped with said vehicular radar sensing system;

wherein said radar sensor comprises a plurality of antennas;

wherein said plurality of antennas comprises a plurality of transmitting antennas and a plurality of receiving antennas;

wherein said radar sensor transmits multiple outputs via said plurality of transmitting antennas and receives multiple inputs via said plurality of receiving antennas;

wherein said plurality of antennas comprises a plurality of sets of antennas each set having a shape comprising one selected from the group consisting of (i) a V shape and (ii) an X shape, and wherein each of the shaped sets of antennas comprises an apex;

a processor;

wherein a signal feed is provided to the apex of each of the shaped sets of antennas;

wherein outputs of said receiving antennas are communicated to said processor, and wherein said processor, responsive to the outputs of said receiving antennas, determines presence of one or more objects exterior the vehicle and within a field of sensing of said radar sensor;

wherein said processor, responsive to the outputs of said receiving antennas, determines the presence of one or more objects to assist a driver of the vehicle in maneuvering the vehicle in a forward direction; and wherein said vehicular radar sensing system provides sensing for automatic emergency braking of the vehicle.

20. The vehicular radar sensing system of claim 19, wherein the shaped sets of antennas reduce side lobes.

21. The vehicular radar sensing system of claim 19, wherein said processor, responsive to the outputs of said receiving antennas, determines the presence of one or more objects to assist the driver of the vehicle in parking the vehicle in a parking space.

22. The vehicular radar sensing system of claim 19, wherein said vehicular radar sensing system provides sensing for pedestrian detection.

23. The vehicular radar sensing system of claim 19, wherein said vehicular radar sensing system provides sensing for at least one selected from the group consisting of (i) automated parking of the vehicle, (ii) cross traffic alert, (iii) lane change and merge aid, (iv) turn assist and (v) intersection collision mitigation.

* * * * *